Patented Sept. 23, 1947

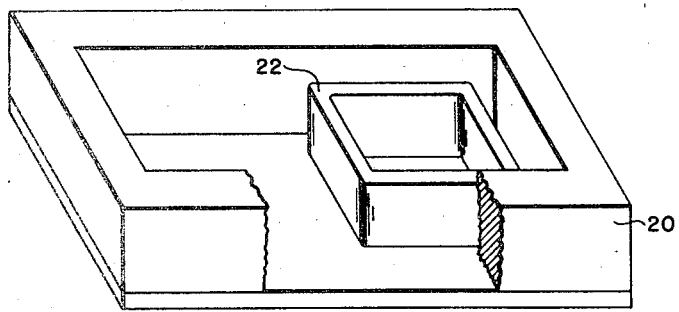
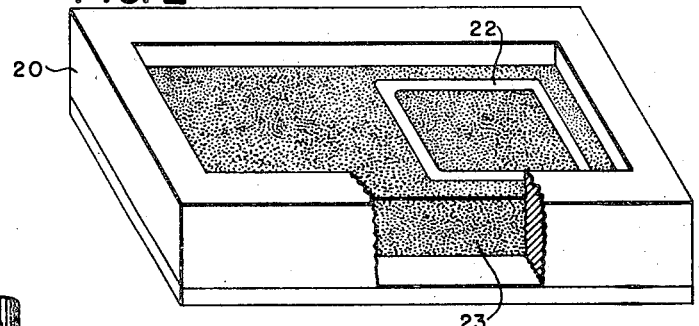
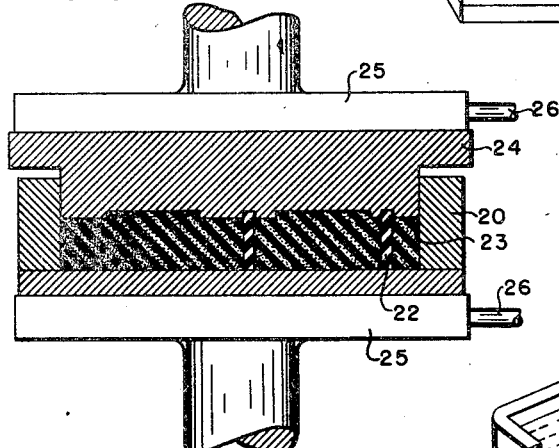
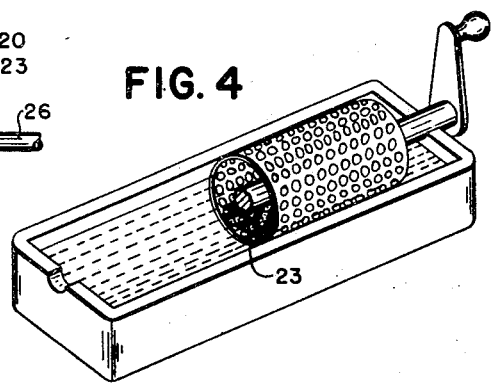
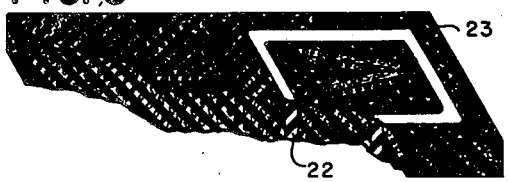

2,427,836

UNITED STATES PATENT OFFICE 2,427,836

PROCESS FOR MAKING POROUS RUBBER POLYCHROME PRINTING PLATES

Robert G. Chollar and Galen J. Wilson, Dayton, Ohio, assignors to The National Cash Register Company, Dayton, Ohio, a corporation of Maryland Application October 11, 1945, Serial No. 621,790

6 Claims. (Cl. 101—401.1)

This invention relates to a process for making a unitary polychrome printing member having a plurality of ink-holding porous resilient rubber printing areas isolated from one another by ink-impervious dams.

Although the invention primarily pertains to printing plates made entirely of rubber, the printing and ink-holding parts of which are porous and the dams of which are non-porous to ink, it is apparent that other moldable materials may be used.

The process includes the step of filling a mold with a molding compound which can be rendered porous, and a molding compound which remains non-porous, said compounds being arranged so that, after molding, the non-porous compound forms dams extending from the bottom surface of the molded printing plate to a point level with the printing surface of the type characters thereon, said dams separating the porous portions.

For purposes of simplicity, the disclosed embodiment of the invention shows the making of a rubber printing plate having two printing portions of porous rubber, each portion having a letter character in relief thereon, the two portions being isolated by a resilient rubber dam which acts as a bond between them. However, other materials, such as uncured filled thermosetting resinous masses, can be used for the dams, if desired.

The principal object of the invention is to provide a novel process for making a unitary homogeneous polychrome printing member having a plurality of ink-saturated micro-porous printing areas, said areas being isolated from each other by ink-impervious dams.

The term "rubber" is used herein to include both natural and synthetic rubbers.

With this and incidental objects in view, the invention includes certain novel steps which are set forth in appended claims and a preferred form or embodiment of which is hereinafter described with reference to the drawing which accompanies and forms a part of this specification.

Of said drawing:

Fig. 1 is an isometric view of a typical form of mold used in carrying out the process and shows an ink-impervious dam element placed therein.

Fig. 2 is an isometric view of the mold shown in Fig. 1 with the areas around the ink-impervious dam filled with rubber molding compound.

Fig. 3 is a cross-sectional view of the filled mold of Fig. 2 and shows the male section of the mold in the position which it assumes during the vulcanizing step of the process.

Fig. 4 illustrates an example of a device which may be used in leaching the molded article.

Fig. 5 is an isometric view of one form of printing plate produced by the process.

General description

Although the process to be described is available for any product using any moldable raw materials, the process will be described particularly with reference to printing plates made with synthetic rubber-like materials containing vulcanizing ingredients, such as those described in United States Patent No. 2,353,877, issued on July 18, 1944, to Robert G. Chollar. However, it is not intended to limit the process to the exact formula described in said patent.

The process consists essentially of the following steps:

1. Placing insulating dams of unvulcanized rubber or uncured thermo-setting plastic resin in a mold;
2. Filling the areas around the dams with unvulcanized rubber molding compound which is capable of being rendered micro-porous;
3. Molding the dams and the unvulcanized molding compound and vulcanizing them into a homogeneous mass to form a printing plate;
4. Removing the molded and vulcanized printing plate from the mold and leaching the plate to render the areas around the dams micro-porous; and
5. Saturating the micro-porous area with ink of different colors.

Detailed description

In carrying out the process of producing a polychrome micro-porous printing plate, one or more dams 22 of ink-impervious material, depending on the number of colors to be printed by the finished printing plate, are placed in a die mold 20 (Fig. 1), preferably of the positive pressure type. The dams are of a height extending from the bottom of the die to a position level with the surface of the printing characters to be molded on the printing plate as shown in Fig. 5. Thereafter, the micro-porous molding compound 23 is placed into the die to fill the areas around the dams. The upper section 24 of the mold is provided with suitable matrices to form any desired character on the surface of the finished printing plate in the areas comprising the micro-porous molding compound. A pressure suitable to mold the moldable compound is applied during the molding operation. A vulcanizing temperature suitable for the compound is used and is applied in a press 25 (Fig. 3) by any suitable means. If steam is selected for the heating step, the steam is supplied to the press through pipes 26, after the molding. If desired, the heat can be applied after the removal of the molded printing plate from the mold.

Leaching

When using the molding compound described in said patent, the filler of sodium nitrate is removed from the molded printing plate (Fig. 5) by washing it in hot water, for example, as shown in Fig. 4, with a wetting agent mixed therein if desired, as long as necessary to completely remove said filler. The time necessary to remove the sodium nitrate from the molded plate varies with the thickness of the plate and the size of mesh particle size used in mixing the micro-porous molding material. The time required for removing sodium nitrate from a web $10/1000$ of an inch thick and of 250 mesh particle size, by swirling it in hot water, is about two hours. Thicker webs and finer pore structure require a longer time and some manipulation. For other fillers than those specified, common laboratory methods for removing dissolvable materials may be used.

Since the dams 22 are made of materials which do not contain soluble materials, such as sodium nitrate, nothing is washed out of them, and they remain solid and ink-impervious throughout the leaching step of the process.

After the leaching step has been completed, the printing plate forms a homogeneous member having micro-porous areas, and dams, or dividing walls, which are impervious to ink. Now the micro-porous areas are filled or saturated with ink, each area being filled with the desired color of ink, so that, upon making an impression with the saturated printing plate, each micro-porous area will produce an impression of the desired color in one printing operation.

The process described forms a printing plate having a very smooth printing surface. The smooth printing surface results from the fact that the molding compound is solid in action during the molding operation. The presence of the sodium nitrate in the molding compound makes this result occur. The size of the fine pores acting in conjunction with the very smooth printing surface obtained provides a printing surface which produces a very fine printed character.

While the form of the invention shown herein is admirably adapted to fulfill the object primarily stated, it is to be understood that it is not intended to confine the invention to the one form or embodiment disclosed, for it is susceptible of embodiment in various forms all coming within the scope of the claims which follow.

What is claimed is:

1. The process of making a micro-porous polychrome printing plate, including the step of placing a dam of vulcanizable rubber in a mold, the step of filling the areas around the dam with a moldable and vulcanizable compound containing a comminuted soluble filler, the step of molding the vulcanizable compound under pressure, the step of subjecting the molded vulcanizable compound and the dams of vulcanizable rubber to a vulcanizing temperature, the step of removing the filler by leaching, and the step of filling the pores of each leached area with ink of a different color.

2. The process of making a homogeneous microporous printing plate for polychrome printing, including the step of placing one or more dams of vulcanizable rubber in a mold, the step of filling the areas in the mold not occupied by the dams with a moldable and vulcanizable compound containing a soluble filler, which filler renders the molding compound solid in the molding operation, the step of molding the compound and dams under pressure to form printing characters on one surface of the compound portion of the molded printing plate, the step of applying vulcanizing temperature to the molded printing plate to vulcanize the dams and the compound to form a homogeneous mass, the step of dissolving the filler from the said areas around the dams to create pores therein, and the step of saturating the pores with ink.

3. The process of making a micro-porous polychrome printing plate, including the step of placing a dam of filled thermo-setting resinous material into a mold, the step of filling the areas around the dam with a moldable and vulcanizable compound containing a comminuted soluble filler, the step of molding the dam and the compound into a solid mass under pressure, the step of subjecting the molded mass to a vulcanizing temperature, the step of removing the soluble filler from the vulcanized rubber by leaching to form pores therein, and the step of saturating the pores of each leached area with ink of a different color.

4. The process of making a homogeneous microporous printing plate for polychrome printing, including the step of placing one or more dams of thermo-setting material in a mold, the step of filling the areas in the mold not occupied by the dams with a moldable compound containing a soluble filler, the step of molding the compound under pressure to form printing characters thereon, the step of applying heat to the molded printing plate to thermo-set the printing plate, to thereby form a unitary mass, the step of dissolving the filler from said areas around the dams to create pores in said areas, and the step of saturating the pores with ink.

5. The process for making a unitary flexible printing plate having a plurality of porous printing portions which are isolated from each other in the plate and which may be charged with different colored inks to enable polychrome printing to be obtained, said process including the step of placing vulcanizable rubber ink impervious dams and vulcanizable filled-rubber in desired locations in the mold to enable a plurality of isolated printing portions of filled-rubber to be obtained; the step of molding the dams and filled-rubber to form a unitary printing plate having indicia on the filled-rubber portions of the plate; the step of vulcanizing the molded plate; and the step of removing the filler from the filled-rubber portions of the plate to form microscopic interconnecting pores throughout each of said isolated printing portions of the plate, said porous rubber portions and rubber dams forming a unitary flexible printing plate.

6. The process for making a printing plate having a plurality of porous printing portions which can carry their own ink supply and are isolated from each other so that they may be charged with different colored inks to enable polychrome printing to be obtained, said process including the step of placing vulcanizable rubber ink-impervious dams and vulcanizable filled-rubber in desired locations in the mold to enable a plurality of printing portions of filled-rubber isolated by the ink-impervious dams to be obtained; the step of molding the dams and filled-rubber to form a unitary printing plate having indicia on the filled-rubber portions of the plate; the step of vulcanizing the molded plate; the step of removing the filler from the filled-rubber portions of the plate to form microscopic interconnecting pores throughout each of said isolated printing portions of the plate; and the step of charging the pores of the various printing portions with inks of the desired colors.

ROBERT G. CHOLLAR.
GALEN J. WILSON.

REFERENCES CITED

The following references are of record in the file of this patent:

UNITED STATES PATENTS

| Number | Name | Date |
|---|---|---|
| 2,226,163 | Dufour | Dec. 24, 1940 |
| 2,349,613 | Chollar | May 23, 1944 |
| 972,359 | Gibson | Oct. 11, 1910 |
| 1,947,986 | Harley | Feb. 20, 1934 |